United States Patent [19]

Bauck

[11] 4,398,228

[45] Aug. 9, 1983

[54] METHOD OF AVOIDING RESONANCE IN SERVO CONTROLLED APPARATUS

[75] Inventor: Randall C. Bauck, East Layton, Utah

[73] Assignee: Iomega Corporation, Ogden, Utah

[21] Appl. No.: 258,402

[22] Filed: Apr. 28, 1981

[51] Int. Cl.³ .............................................. G11B 21/10
[52] U.S. Cl. ......................................... 360/77; 360/78
[58] Field of Search .................................... 360/97–99, 360/77–78, 104–105, 75; 318/616, 629

[56] References Cited

U.S. PATENT DOCUMENTS

| | | | |
|---|---|---|---|
| 3,122,687 | 2/1964 | Romvari | 360/77 |
| 4,168,457 | 9/1979 | Rose | 360/78 |
| 4,268,785 | 5/1981 | Svendsen | 360/78 |
| 4,321,517 | 3/1982 | Touchton et al. | 360/78 |

OTHER PUBLICATIONS

IEE Transactions on Magnetics, F. A. Samuels, Beyond the Second Order System in Track Following Servos, vol. Mag.-14, No. 4, Jul. 1978, pp. 178–181.

IBM TDB, R. S. Palmer, Automatic Notch Frequency Control for Servo Stabilization, vol. 19, No. 10, Mar. 1977, pp. 3860–3862.

Primary Examiner—Alfred H. Eddleman
Attorney, Agent, or Firm—Woodcock, Washburn, Kurtz, Mackiewicz & Norris

[57] ABSTRACT

An improved disk drive for storage of digital data is disclosed featuring a servo circuit used to drive the read/write head back and forth with respect to the media, the motion of the head being controlled by a servo circuit reading position signal data from the disk. The position data is stored in a sample and hold circuit having a transfer function dropping to a minimum value at the sampling rate; by choosing the resonant frequency of the head and servo apparatus assembly to be substantially equal to the sampling frequency, the mechanical resonance appearing in the system is effectively damped out.

6 Claims, 3 Drawing Figures

METHOD OF AVOIDING RESONANCE IN SERVO CONTROLLED APPARATUS

FIELD OF THE INVENTION

This invention relates to means for avoiding mechanical resonances in servo controlled apparatus. More particularly, the invention relates to a method whereby mechanical resonances in the arm carrying a read/write head in proximity to a magnetic recording disk can be avoided by selection of the resonance frequency to be substantially equal to the sampling rate.

BACKGROUND OF THE INVENTION

This invention relates to the design of an arm for the carriage of a read/write head for motion in juxtaposition to a magnetic recording surface for the recording of digital data.

It is known to control such arms by servo loops in which the read/write head is used to detect position information from dedicated portions of the magnetic recording surface, typically a disk, and to use this information in controlling the motor which moves the read/write head with respect to the disk so as to access various portions of its surface, in addition to the read/write head's primary function of reading and writing actual digital data to areas of the disk. As is typically the case in servo controlled systems, it is possible that mechanical resonance can be encountered in operation of the mechanical parts of this system. In order to avoid allowing the mechanical resonance to be excited by the operation of the servo circuit, it has been the typical prior art practice to design the mechanical portions of the apparatus which are subject to resonance and the servo circuit such that the resonant frequency of the mechanical system is outside the bandwidth of the servo system. Typical methods of designing the arm to control its resonance frequency involve making it either heavier or out of a more expensive, stiffer material, so that resonance is reduced, or its frequency is moved out of the servo circuit's bandwidth. However, these solutions are not optimum; for example, it may well be that the preferred mechanical design of the apparatus is such that its natural resonant frequency is near the sampling rate. Any departures from the desired design, therefore, would involve a compromise in performance.

OBJECTS OF THE INVENTION

It is therefore an object of the invention to provide an improved servo controlled mechanical actuator for accessing a disk drive.

Another object of the invention is to provide a mechanical actuator for a disk drive, the resonant frequency of which need not be designed to substantially differ from the sampling frequency of a servo loop used to control its motion.

SUMMARY OF THE INVENTION

The above objects of the invention and needs of the art are satisfied by the present invention in which the resonant frequency of the mechanical portion of a servo loop is controlled so that it is substantially equal to the sampling frequency of the servo circuit, where the servo circuit employed is one which contains a sample and hold component as an essential part of the loop. Inasmuch as the transfer function of the sample and hold circuit drops substantially to zero at the sampling rate, this operates to remove the resonance of the actuator arm from the servo loop so that the overall transfer function of the actuator in the servo loop is reduced sufficiently closely to zero that the loop is stable despite the presence of possible mechanical resonance at the sampling rate.

BRIEF DESCRIPTION OF THE DRAWINGS

The invention will be better understood if reference is made to the accompanying drawings, in which.

DESCRIPTION OF THE PREFERRED EMBODIMENTS

Figure 1:
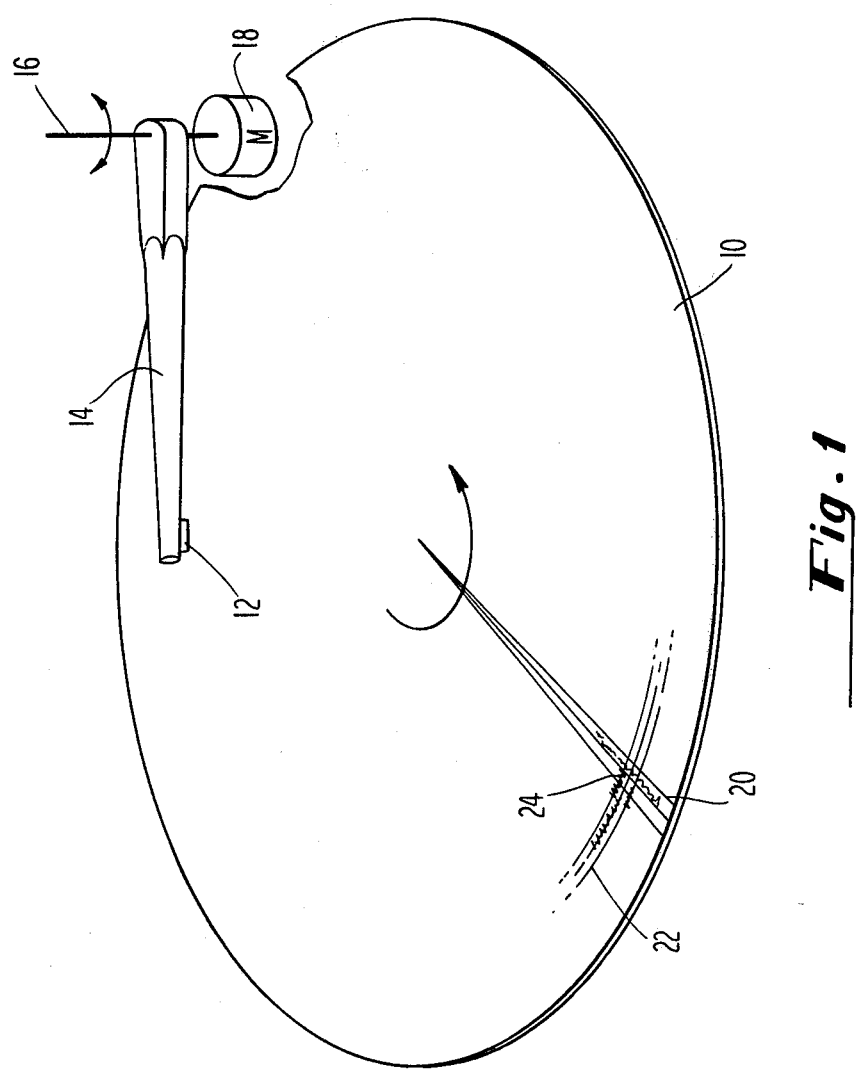
FIG. 1 shows an overall perspective view of the disk drive within which the arm of the invention plays an important part.

Referring now to FIG. 1 an overall view of the disk drive of the invention is shown. A disk 10 rotates in a single direction about its axis. In a particularly preferred embodiment, the disk may be what is generally known as a so-called "floppy" disk, though this is not critical to the present invention. A magnetic read/write head 12 is disposed at the end of a servo arm 14 which rotates back and forth about its axis, indicated generally at 16, under the control of the servo motor 18 so that the read/write head 12 can access various portions of the disk 10.

Permanently written on the disk is servo position information which is used to enable positive location of particular areas of the disk surface to which the read/write head 12 is to be juxtaposed. Typically the disk will be divided into a plurality of sectors, in a presently preferred embodiment 70 sectors are used. Each comprises an index mark 20 extending from the periphery of the disk to the innermost surface of the area of the disk to which data is written and read. The disk surface is also divided into tracks as indicated generally at 22. In a presently preferred embodiment there are 306 data tracks. The portion of each track 22 following the index mark 20 includes servo fields and the like, indicated generally at 24, which are used to control the operation of the servo motor 18 which in turn controls the relative position of the read/write head 12 with respect to the surface of the disk 10. The particular arrangement used to control the motion of the motor 18 is the subject matter of co-pending application Ser. No. 257,608 filed Apr. 27, 1981, incorporated herein by reference. For purposes of understanding the present invention, it is only necessary to know that the specific circuit disclosed in that application includes as an essential part a sample and hold circuit used to sample the value of the servo data information 24 read by the head 12 and then hold this value for comparison purposes with a command value to determine the accuracy of positioning of the head with respect to the disk.

Figure 2:
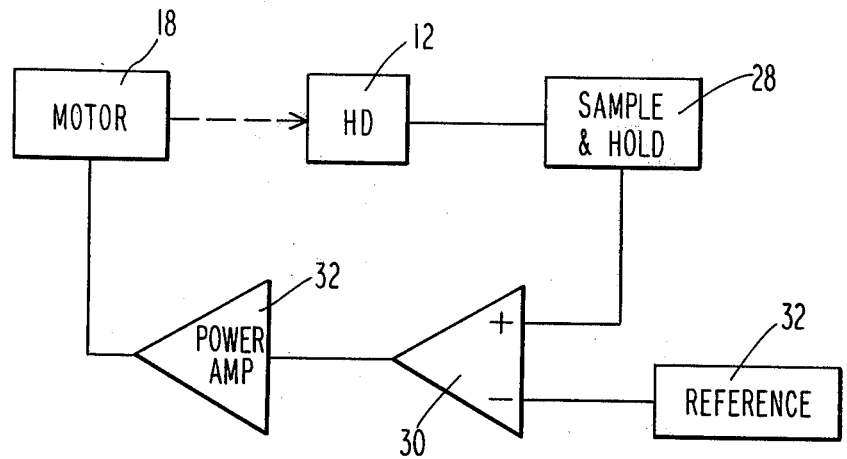
FIG. 2 shows a functional block diagram of circuitry used to control the motion of the arm.

The servo loop used to control the servo motor 18 is shown in FIG. 2. The read/write head 12 picks up servo data such as that indicated generally at 24 and the value calculated for control of the motor in accordance with the co-pending application referred to above is stored in a sample and hold circuit 28 for comparison in a comparator 30 with a reference command supplied by, e.g., a microprocessor used for servo control. The output of the comparator, that is, a signal indicative of the accuracy of position of the head or the desirability of modification thereof, is passed to a power amp 32 which is used to control the servo motor 18. The servo motor 18 moves the head, completing the loop.

It will be appreciated by those skilled in the art that the circuit shown in FIG. 2 and just described is a servo circuit having in it a mechanical element, specifically the connection between the motor and the head 12, and that this mechanical system will naturally have a resonant frequency. Further, it will be understood that improper design of the arm, such that its resonant frequency is at or near the servo loop bandwidth, or is an integral multiple of one half of the sampling frequency above the servo bandwidth, can lead to instabilities through the mechanism known as aliasing. The aliasing phenomenon is detailed in textbooks and can be simply explained as a high frequency resonance appearing in the base-band frequency range, that is, from zero to one-half the sampling rate. The appearances of these false or "aliased" signals due to resonance can cause an erosion of stability margins and in extreme case can lead to instability. As noted above, typical prior art techniques for limiting aliasing by eliminating resonance in a servo circuit involve designing the mechanical construction of the apparatus so that its resonant frequency or any aliased resonance is outside the bandwidth of the servo loop, thus avoiding severe erosion of loop stability margins. However, as noted above, this is not always convenient, nor does it completely eliminate erosion of the stability margins.

As detailed in the co-pending application referred to above, a sample and hold element is of use in controlling the servo motor. It is known that the transfer function of such a sample and hold circuit is at a minimum at the sample frequency. This fact is used by the present invention wherein the servo circuit contains the sample and hold element and the mechanical resonance of the servo arm is purposely made substantially equal to this sampling frequency. The fact that the transfer function of the sample and hold circuit drops to near zero at the sample frequency means that the mechanical resonance is not transmitted to the servo circuit, thus avoiding mechanical resonance.

Figure 3:
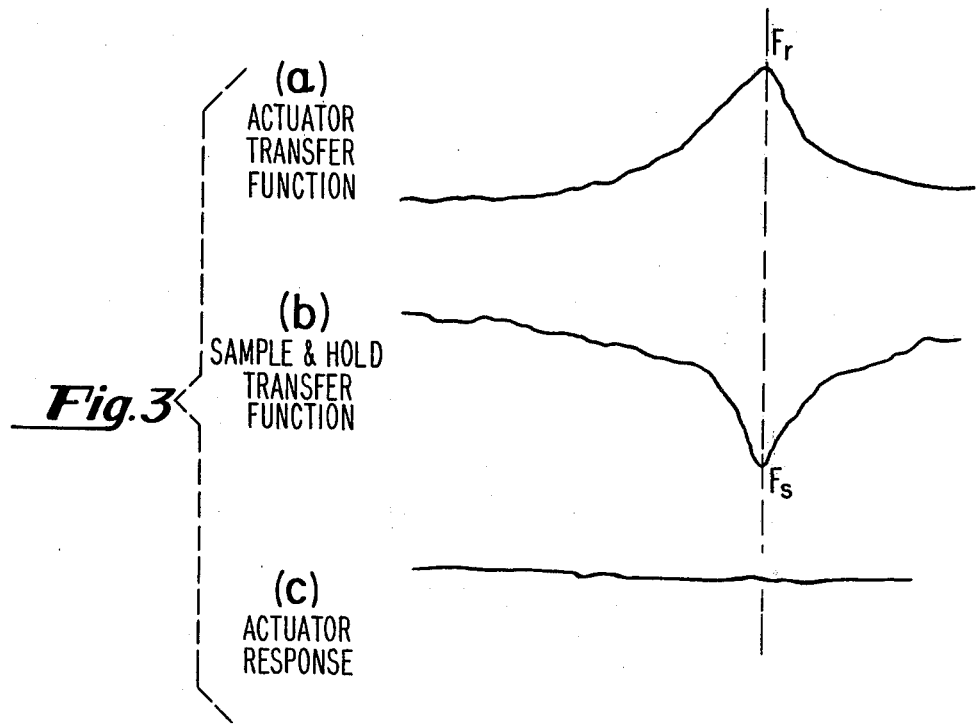
FIGS. 3A through C shows graphs of, respectively, the actuator transfer function, the sample and hold circuit transfer function and the actuator response.

This effect is shown graphically in FIGS. 3A through C. A typical actuator transfer function is shown with a peak at some resonant frequency $F_r$. In FIG. 3B the sample and hold circuit transfer function is shown having a minimum at the sampling frequency $F_s$. If $F_r$ and $F_s$ are combined in a real circuit, the overall actuator response is substantially shown in FIG. 3C, that is, having little frequency dependence. This allows design of the arm to be freed from the constraint that its mechanical resonance be outside the bandwidth of the servo circuit. Instead, by designing the mechanical system such that its resonant frequency is at or near the sampling frequency in a circuit using a sample and hold element, the resonance is effectivly cancelled. It will be appreciated that mechanical design of a servo arm having its resonant frequency desirably at or near the sampling rate together with use of the sample and hold circuit in the servo loop is thus a particularly synergistic combination. The applicant has also noted that the substance known as "Blocking Wax" used in the semiconductor industry is useful in the assembly of servo systems according to the invention, particularly in connection with the servo motor bearing assembly.

Those skilled in the art will recognize that in addition to the preferred embodiment of the invention discussed above, numerous modifications and improvements can be made thereto without departure from the essential spirit and scope of the invention, which is therefore to be limited only by the following claims.

I claim:

1. In a magnetic disk drive of the type comprising a mechanical arm moving a read/write head with respect to a rotatable disk, the position of said head with respect to the disk being controlled in accordance with position information data recorded on said disk, read by said head and employed in a servo circuit comprising a sample and hold element;

the improvement which comprises the mechanical resonance frequency of said movable arm being chosen to be substantially equal to the rate at which said position information is sampled and stored in said sample and hold element.

2. The drive of claim 1 wherein said information data is sampled and held in said sample and hold circuit prior to being supplied to a comparator circuit for comparison with a desired position information signal supplied by control means.

3. The drive of claim 2 wherein the output of said comparator circuit is supplied to power amplifier means for driving said servo motor in a desired direction.

4. In a servo circuit for the control of the motion of mechanical apparatus, the motion of said apparatus being sampled at predetermined intervals and stored in a sample and hold circuit for comparison with a reference input, the improvement which comprises the resonant frequency of said mechanical apparatus being chosen to be substantially equal to said predetermined rate of sampling.

5. The apparatus of claim 4 wherein said apparatus is means adapted to move a read/write recording head in juxtaposition to a magnetic recording media for reading and writing of data.

6. Method of operation of a disk drive of the type comprising:

means for rotating magnetic disk media at a substantially constant speed, said disk containing thereon permanently recorded information indicative of the position of said disk;

a read/write head juxtaposed to said disk for detecting said information; and means for moving said read/write head with respect to said disk, comprising the steps of:

providing means for sampling said detected information at a fixed rate;

holding said information in a sample and hold circuit having a transfer function reaching a minimum at the sampling frequency;

comparing the contents of said sample and hold circuit with a reference signal and using the results of said comparison to drive said means for moving said head;

wherein the resonant frequency of said means for moving said heads is substantially equal to said sampling rate.

* * * * *